(12) United States Patent
Sadowski (10) Patent No.: US 11,775,349 B2
(45) Date of Patent: Oct. 3, 2023

(54) MACHINE INTELLIGENCE PROCESSOR WITH COMPUTE UNIT REMAPPING

(71) Applicant: Advanced Micro Devices, Inc., Santa Clara, CA (US)

(72) Inventor: Greg Sadowski, Boston, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 1202 days.

(21) Appl. No.: 16/229,138

(22) Filed: Dec. 21, 2018

(65) Prior Publication Data

US 2020/0202215 A1    Jun. 25, 2020

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01); *G06F 9/5077* (2013.01)

(58) Field of Classification Search
CPC ...... G06F 9/505; G06F 9/5077; G06F 9/4881; G06F 11/0806; G06F 11/0724; G06F 13/00; G06F 12/0806
See application file for complete search history.

(56) References Cited

U.S. PATENT DOCUMENTS

2017/0220384 A1*  8/2017  Anderson ............. G06F 9/4893
2020/0125953 A1*  4/2020  Yoo ........................ G06N 3/047

* cited by examiner

*Primary Examiner* — Tom Y Chang (57) ABSTRACT

One or more processors are operative to carry out neural network operations and include a plurality of compute units (CUs) configurable for neural network operations. The neural network compute unit remapping logic detects a condition to remap neural network compute units that are currently used in carrying out a neural network operation in a processor with at least one replacement compute unit that is not currently being used to carry out the neural network operation. In response to detecting the condition, the logic remaps a logical address of at least one currently used compute unit to a different physical address that corresponds to the replacement compute unit and causes the replacement compute unit to carry out neural network operations.

18 Claims, 6 Drawing Sheets

MACHINE INTELLIGENCE PROCESSOR WITH COMPUTE UNIT REMAPPING

BACKGROUND OF THE DISCLOSURE

Machine intelligence processors, also referred to as machine learning accelerators among other terms, run artificial intelligence (AI) algorithms and are being developed that employ processing cores wherein each processing core includes multiple compute units. Machine intelligence processors such as graphics processing units (GPUs), tensor processing units (TPUs), central processing units (CPUs), field programmable gate arrays (FPGAs), or any other processors being employed as neural networks run the neural networks over and over with the same execution patterns with different data. The compute units are connected as neurons or nodes in neural networks capable of performing a wide range of tasks very efficiently, but in order to do these tasks, a neural network first has to be trained on how to perform those tasks. A neural network can perform, for example, recognizing pictures of dogs but has to first be taught what a dog looks like, ideally across all breeds. This can mean exposing the neural network to thousands if not millions of images of dogs. This is an enormous task that is very time consuming and uses large amounts of processing power.

Neural network compute units can receive input data and kernels or executable modules. Neural networks employ different layers, a layer being a level in a computing hierarchy. For example, a four-layer neural network may have an input layer that receives input data and other input information, two hidden layers and an output layer to form a four-layer neural network. Typically, all nodes of a single layer have the same properties such as matrix multiplication of inputs by weights (each neuron has its own weights), activation functions, back propagation kernels and similar inputs or other suitable information.

In some machine intelligence processors, a compiler typically logically assigns CUs in a neural network to particular physical CUs and some physical CUs may be unused. This is done by assigning logical CU addresses to physical CU addresses. However, once the CUs are mapped from a logical address to a physical CU, they are fixed for that neural network operation which may continue for long periods such as years. This can result in an undesirable degradation of the die, chip or package that contains the processors that employ the CUs.

There is a need for enhanced machine intelligence processors that have improved performance for neural network algorithm execution.

BRIEF DESCRIPTION OF THE DRAWINGS

The implementations will be more readily understood in view of the following description when accompanied by the below figures, wherein like reference numerals represent like elements, and wherein.

DETAILED DESCRIPTION OF IMPLEMENTATIONS

Neural network compute unit remapping logic and methods periodically remap logical addresses of compute units that are employed in neural networks on machine intelligent processors, to different physical CUs over time during operation of the same neural network. This makes the usage of all compute units more uniform over time so that they age at the same rate thereby avoiding earlier aging by some CUs and not others which would otherwise shorten the life of the whole processor die, chip or package component that contains the processors.

It has been discovered that the repeatable over time, cyclical calculations and data movement patterns will use some areas of silicon more than others and contribute to accelerated aging in those areas. For example, one neural network algorithm may run on a GPU silicon chip for a number of years and certainly on the scale adequate for silicon chip longevity degradation. Repeated over and over silicon hardware usage patterns will cause aging of the part that is not uniform and may end the life of a silicon GPU chip early. It has been discovered that while running neural network applications on GPUs, for example, the computation and data movement may not be distributed uniformly over the silicon hardware circuits. For example, some of the Compute Units (CUs) may be used more frequently than others. Those circuits that are switched more often will age quicker and stop functioning within technical specifications and such part will be considered to reach end of life and will need to be replaced, and the customer investment may be not be appreciated. The disclosed solutions modify behavior of the machine intelligence processors accelerating a neural network such that the burden of computation and data movement is more uniformly distributed over the hardware circuits (e.g., compute units, and/or registers) which ultimately will extend the life of the processor silicon chip.

In some implementations, one or more processors are operative to carry out neural network operations and include a plurality of compute units (CUs) configurable for neural network operations. The neural network compute unit remapping logic detects a condition to remap neural network compute units that are currently used in carrying out a neural network operation with at least one replacement compute unit that is not currently being used to carry out the neural network operation. In response to detecting the condition, the neural network compute unit remapping logic remaps a logical address of at least one currently used compute unit to a different physical address that corresponds to the replacement compute unit and causes the replacement compute unit to carry out neural network operations.

In some implementations, an apparatus includes one or more processors that are operative to carry out neural network operations include a plurality of compute units (CUs) configurable for neural network operations and includes a memory hierarchy structure operatively accessible by the plurality of CUs. Neural network compute unit remapping logic includes a neural network sequence scheduler and a remapping controller. The neural network sequence scheduler detects a condition to remap neural network compute units that are currently used in carrying out a neural network operation with at least one replacement compute unit that is not currently being used to carry out the neural network operation. The neural network sequence scheduler produces remap indication data that indicates to remap a currently mapped logical address of a CU to a different physical CU in response to detecting the remap condition. The neural network sequence scheduler produces remap readiness data indicating that a timing of remapping of CUs is appropriate. The remapping controller is responsive to the remap indication data and to the remap readiness indication data, and in response thereto, generates at least one remapping table entry that causes a remap of a logical address of at least one currently used compute unit to a physical address that corresponds to the replacement compute unit and causes the replacement compute unit to carry out neural network operations. Typically, during a neural network operation, kernels are run on each CU that use input data for the CU and the replacement CU is provided with the appropriate input data and kernel to carry out the neural network operations. Remapping of CU registers is also contemplated as set forth below.

Figure 1:
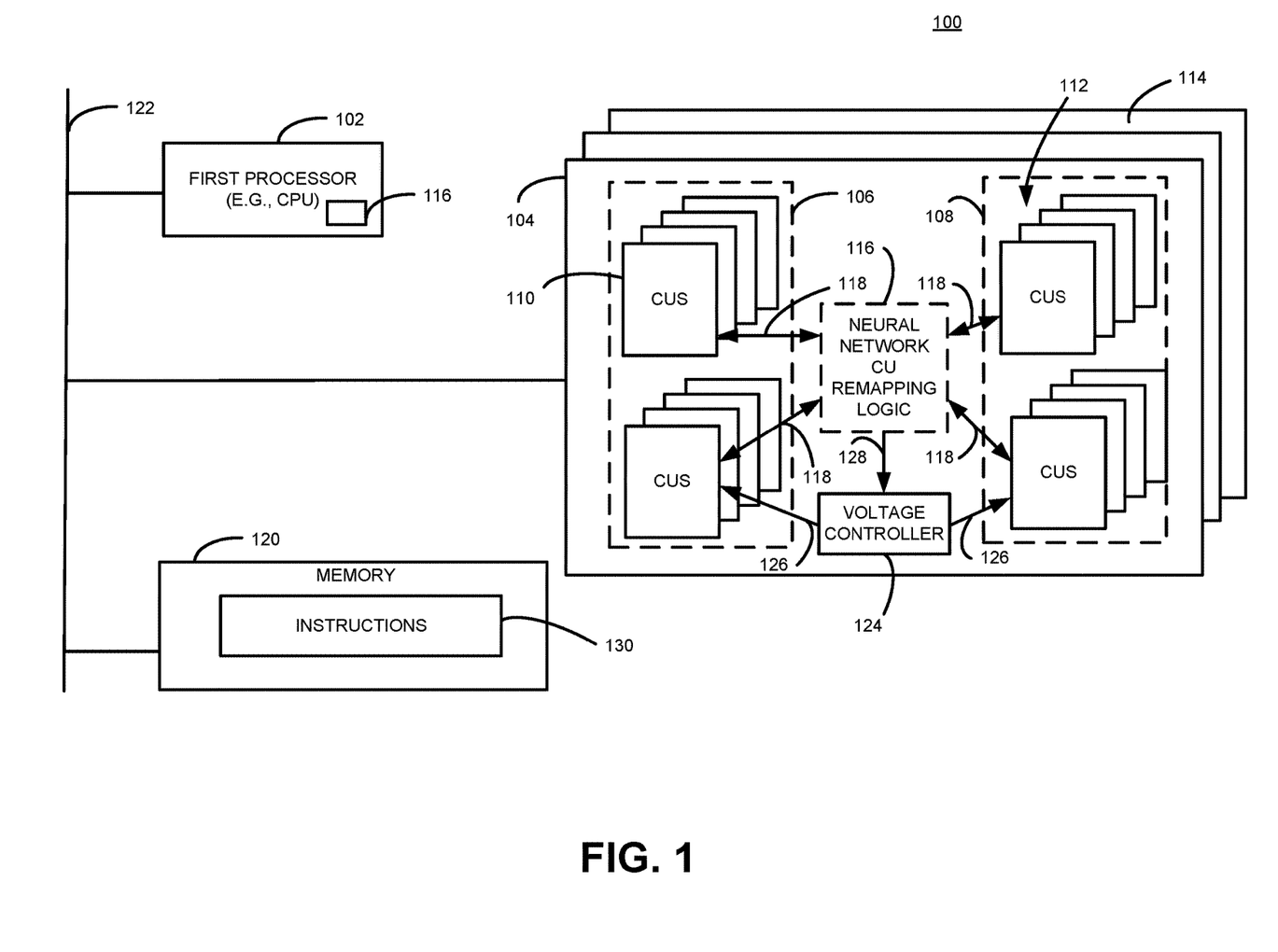
FIG. 1 is a block diagram illustrating one example of an apparatus employing neural network compute unit remapping logic in accordance with the disclosure.

FIG. 1 is a block diagram illustrating one example of an apparatus 100 that includes a first processor 102 such as a central processing unit or other suitable processor, a second processor 104 such as GPU or other machine intelligence processor that includes multiple processing cores 106 and 108 wherein each core includes multiple compute units generally shown as 110 and 112. It will be recognized that first processor 102 may also be a machine intelligence processor or that any suitable number of processors may be employed. Multiple processors 114 are also shown. The processor 104 may be part of an integrated circuit that includes the first processor 102 as well as suitable memory 120 that includes a memory hierarchy which includes cache memory (not shown) as known in the art. The first processor 102, second processor 104 and memory 120 is interconnected through a bus network generally shown as 122. The processor 104 includes neural network CU remapping logic 116 that communicates with the CUs 110 and 112 via suitable communication links generally shown by arrows 118. A voltage controller 124 controls voltages provided to the CUs through suitable control signals 126 as known in the art. The neural network CU remapping logic 116 in one example issues voltage control information 128 to the voltage controller to change the operating voltage of one or more CUs as re-mapping of CUs will lead to extended life of the chip. In one example, the neural network CU re-mapping logic 116 causes increasing of CU supply voltages and increases in operating clock speeds, which in turn shorten the life of the chip to the level of a regular life span. The apparatus 100 may be any suitable device such as an integrated circuit and/or package, web server, smart phone, wearable, tablet, game console, digital television, printer, or any other suitable device that carries out neural network operations.

The compute units 110 and 112 may be implemented as any suitable fixed function or programmable processors. In one example, the CUs are implemented as single instruction multiple data (SIMD) compute units that are implemented as part of a graphics processing unit. However, any suitable programmable processing units may be employed. The neural network CU remapping logic 116, in one example, is implemented as a compiler executing on a core of the processor. However, in other examples the neural network CU remapping logic 116 is implemented as one or more state machines and/or a combination of fixed function logic and a processing unit that executes executable instructions generally shown as instructions 130 or any suitable combination of components as desired and may have functions distributed across multiple processors if desired. The neural network CU remapping logic 116 is also shown in dashed lines as being implemented in a processor other than a CPU such as a GPU.

Figure 2:
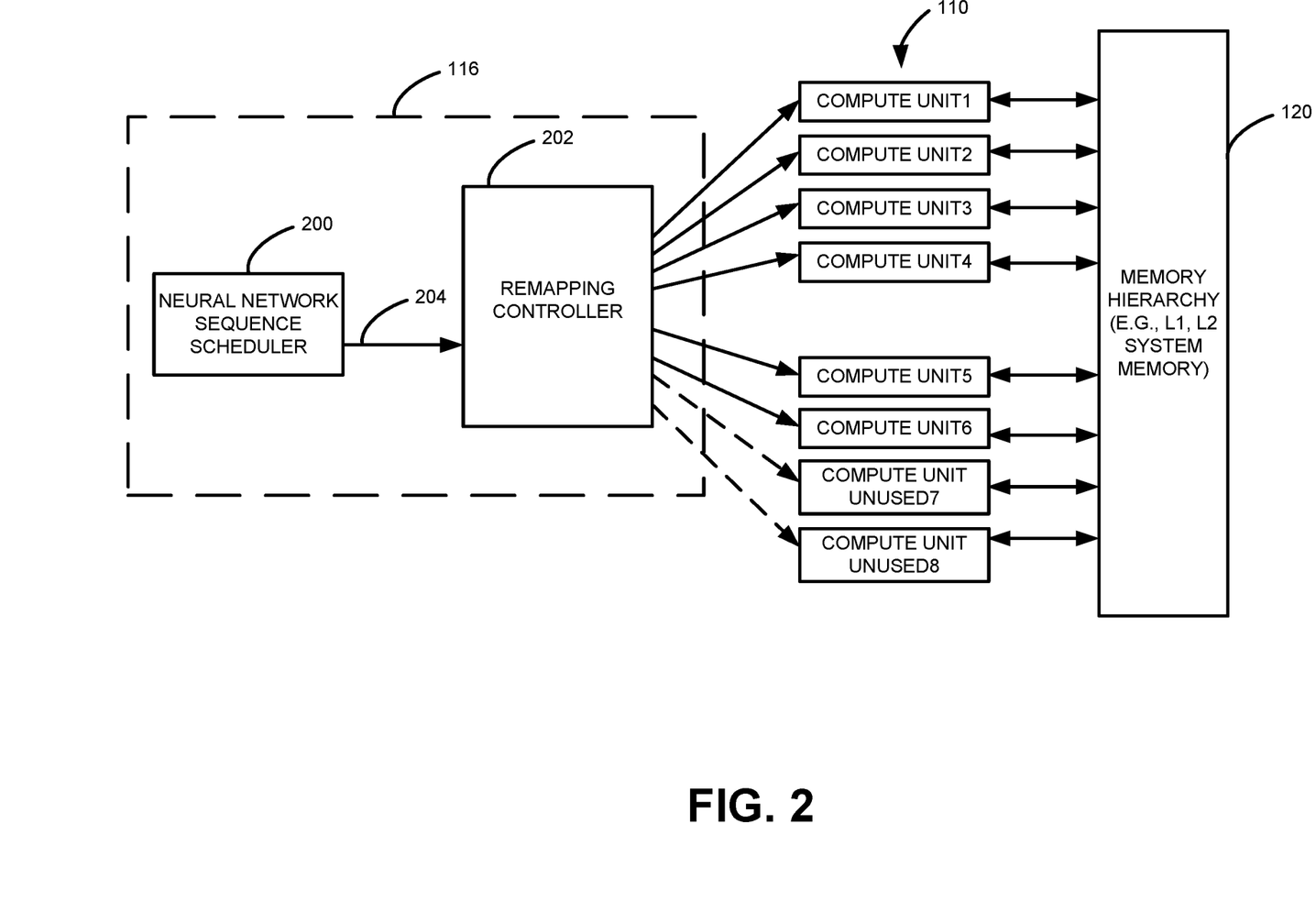
FIG. 2 is a block diagram illustrating one example of an apparatus employing neural network compute unit remapping logic in accordance with the disclosure.
Figure 3:
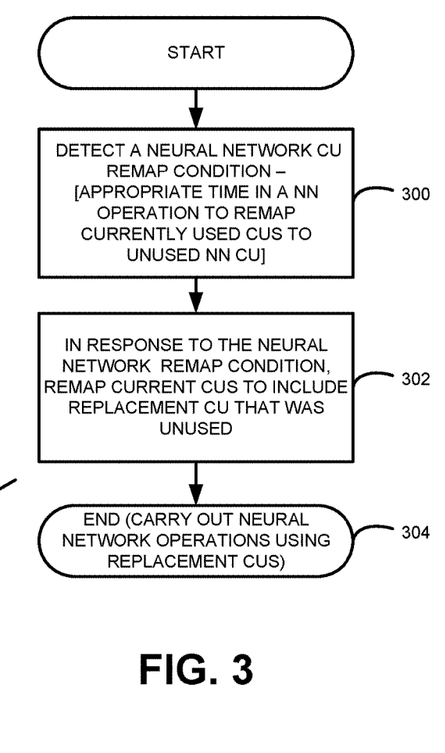
FIG. 3 is a flowchart illustrating one example of a method for controlling a plurality of compute units that carry out neural network operations in accordance with the disclosure.
Figure 4:
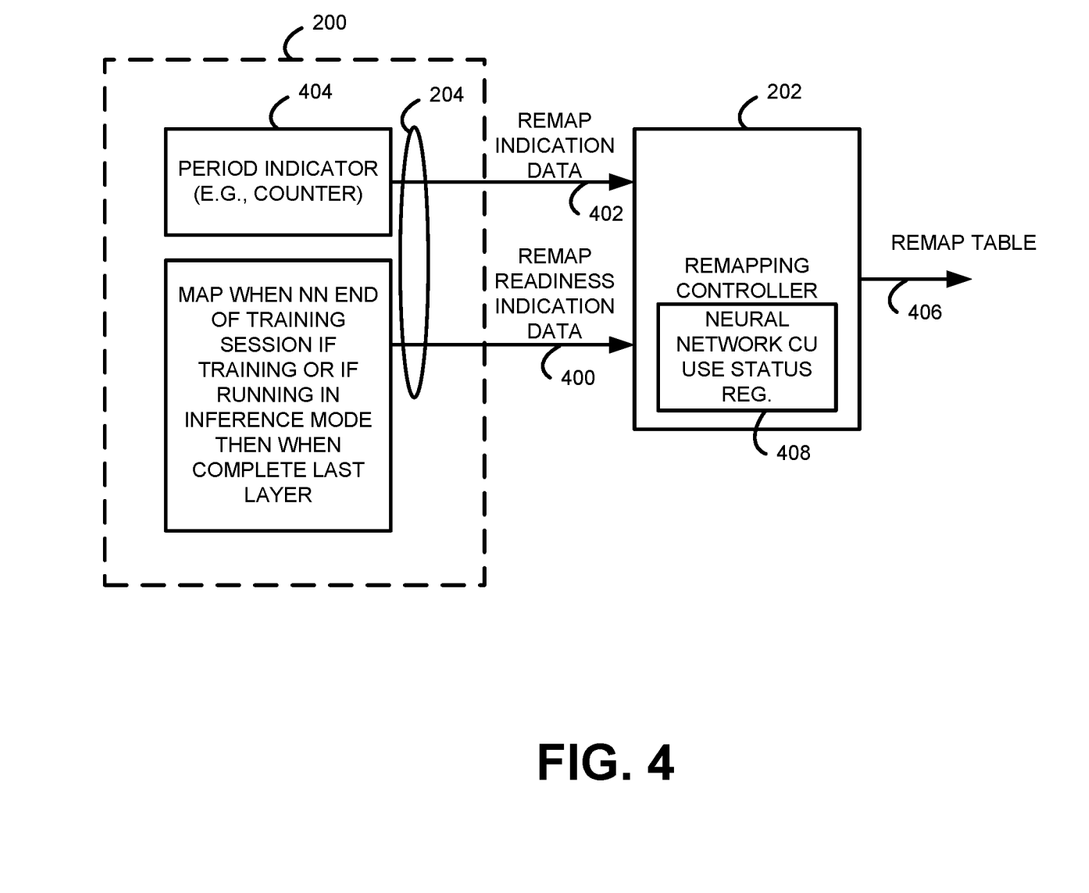
FIG. 4 is a block diagram illustrating one example of neural network compute unit remapping logic in accordance with the disclosure.

Referring to FIGS. 2-4, a method for controlling a plurality of compute units in an integrated circuit that carries out neural network operations will be described in the context of the neural network CU remapping logic 116. As shown in FIG. 2, in one example, the neural network CU remapping logic 116 includes a neural network sequence scheduler 200 and a remapping controller 202. The neural network sequence scheduler 200 provides remapping condition information 204. The remapping controller 202 uses the condition information 204 to remap the neural network compute units that are currently used in carrying out a neural network operation with one or more replacement compute units that are not currently being used to carry out the neural network operation. In this example, the compute units 1-6 are currently carrying out a neural network operation and compute units 7 and 8 are currently unused compute units.

As shown in block 300 of FIG. 3, a method for controlling the compute units includes detecting a neural network compute unit remap condition. In one example, this is done by the neural network sequence scheduler 200. In one example, the condition is a condition indicating that it is an appropriate time in a neural network operation to allow remapping of logically assigned currently used compute units to unused physical neural network compute units. As further set forth below, the condition may be that a training session for the neural network has been completed. Another example of a proper condition is that the neural network is running in an inference mode that has completed a layer of processing. This condition indication is shown as remap readiness indication data 400 (see FIG. 4).

As shown in block 302, in response to the neural network remap condition 204, the remapping controller 202 remaps current compute units that are used in the neural network operation to include replacement CUs that are unused. In this example, compute unit 6 (FIG. 2) is switched out (assigned to a new physical CU) in favor of compute unit 7. As shown in block 304, the method includes carrying out the neural network operations using the replacement compute unit. As such, neural network compute workloads are distributed more evenly among compute units in the integrated circuit during operation of the same neural network. It will be recognized that the processes described herein can be employed across integrated circuits and integrated circuit packages and across web servers if desired.

Referring again to FIG. 4, the remap condition information 204 may also include in addition to, or instead of, remap readiness indication 400, remap indication data 402 based, for example, on a time period lapsing. In this example, a period indicator 404, such as a counter, is set by the neural network sequence scheduler 200 and may be set, for example, for one year or any other suitable time period and when the time period lapses, the remap indication data 402 indicates to the remapping controller 202 to remap a logical address of at least one currently used compute unit to a different physical address that corresponds to a replacement compute unit that is not currently being used. In one example, both the remap indication data 402 and the remap readiness indication data 400 is employed so that when a timeout occurs based on a remap indication data 402, the remapping controller 202 will not cause the neural network operations using the replacement compute unit to occur a readiness condition exists with respect to the execution of the neural network as further described below. In one example, the remapping controller 202 generates a remap table 406 (see for example, FIG. 7). In one example, the remapping controller 202 employs a neural network CU use status register 408 to track the use of the physical CUs in the processor(s) to identify which CUs are currently being used as part of the existing neural network and which CUs are unused. Any other suitable mechanism may also be employed.

Figure 5:
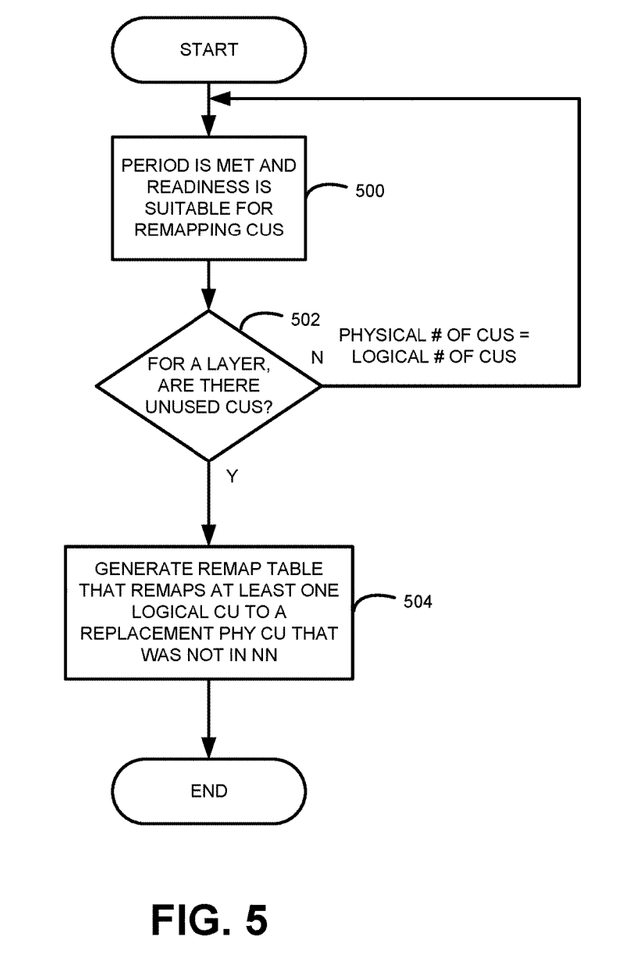
FIG. 5 is a flowchart illustrating one example of a method for controlling a plurality of compute units that carry out neural network operations in accordance with the disclosure.

FIG. 5 illustrates one example of a method carried out by the remapping controller 202. As shown in block 500, the remapping controller 202 determines if a timeout period is met and whether the neural network operations are considered ready for remapping of compute units. In one example, this is done by receiving the remap indication data 402 indicating that the timeout period has occurred based on a counter value and also receiving the remap readiness indication data 400 that indicates that the neural network operation is suitable for remapping CUs. One example of being suitable for remapping is that the training session of the neural network has been completed. In another example, the readiness indication is positive when the neural network is running in an inference mode when a layer is completed. It is desirable to avoid unnecessary data movements caused by remapping. A good opportunity for re-mapping is not in the middle of computation with input data in local registers and local memories, but after the local computation is completed, such that the input and temporary data is used up and not needed anymore, so switching to another CU and loading it with new input data and other data can be performed. This may be done, for example, by the neural network sequence scheduler 200 tracking which layer and which kernel is running in a given layer and which logical CUs are employed.

As shown in block 502, the method includes determining for a given layer of the neural network if there are unused compute units available for remapping. In one example, this includes remapping controller 202 determining if the physical number of CUs is equal to the logical number of CUs for a given layer. If so, then no CUs are unused. However, if there are additional physical CUs that are not in use, the method proceeds to block 504. Determining whether the physical number of CUs equals the logical number of CUs may be done in any suitable manner including use of the neural network CU use status register 408 which tracks which physical CUs are unused and/or used for a given layer. Detecting the condition to remap neural network compute units includes, in this example, also includes determining that a timeout period occurred and which layer the neural network is in operation and whether there are unused compute units for replacement of currently used CUs for that layer.

As shown in block 504, the method includes generating a compute unit remapping table (see FIG. 7) that remaps at least one logical compute unit to a replacement physical compute unit that was not in use in the neural network. For example, the remapping controller generates a remap table that remaps the logical address of at least one currently used compute unit to a different physical address that corresponds to an unused replacement compute unit.

Figure 7:
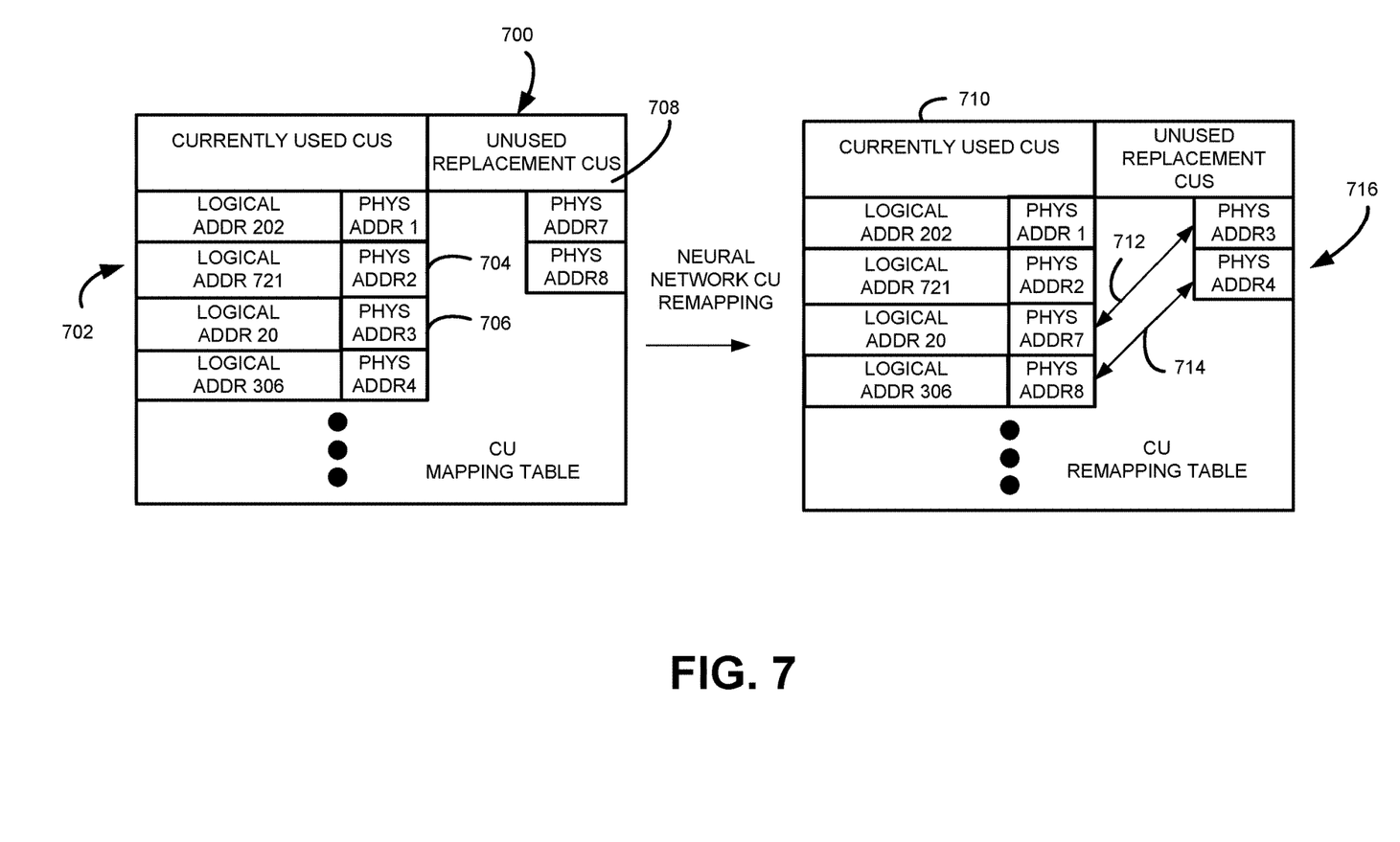
FIG. 7 is a diagram illustrating one example of a compute unit remapping table in accordance with the disclosure.

The remap table 710 in one implementation also includes data that identifies input data to be given to the new compute unit as well as the passing of other information needed by the compute unit to carry out of the operations of the neural network as required. As such, the newly assigned physical compute unit is treated as a replacement compute unit for a prior CU. The remap table 710 also includes in one example, state information from state registers of the current CU so that the replacement CU acts as the current CU before being remapped if needed. Each CU may perform the functions of one or fraction of a neuron. A neuron carries state information, which includes a set of weights (e.g., the weights of the hyperplane equation), and other parameters. The number of parameters depends on the type of neural network running, and in some examples includes parameters for a learning rate, a learning memory or other operations. In one example, all of the information is stored in the CU registers or CU local memory, but it could also be stored in main memory (e.g. DRAM, HBM) and read into CU at start of processing if desired.

Selection of which unused physical CU is selected as the remapped CU may be done in any suitable manner. For example, remapping to a physical CU that is not used includes tracking usage of compute units by the remapping controller 202 in, for example, the remapping table or other table and remapping to a physical address of replacement CUs that are least used. In one example, a counter is employed on a per-CU basis and each time a corresponding CU is selected as part of a neural network, the counter is incremented. The remapping controller looks to see which unused CU has the lowest counter value and selects the CU with the lowest counter value as the next CU for remapping in an effort to balance the workload of the CUs for the neural network. As another example, there may be a random selection of currently unused CUs as the replacement compute unit. In yet another example, a round robin replacement methodology may be used to select the replacement compute unit that is currently unused. It will be recognized that any suitable replacement scheme may be employed.

Figure 6:
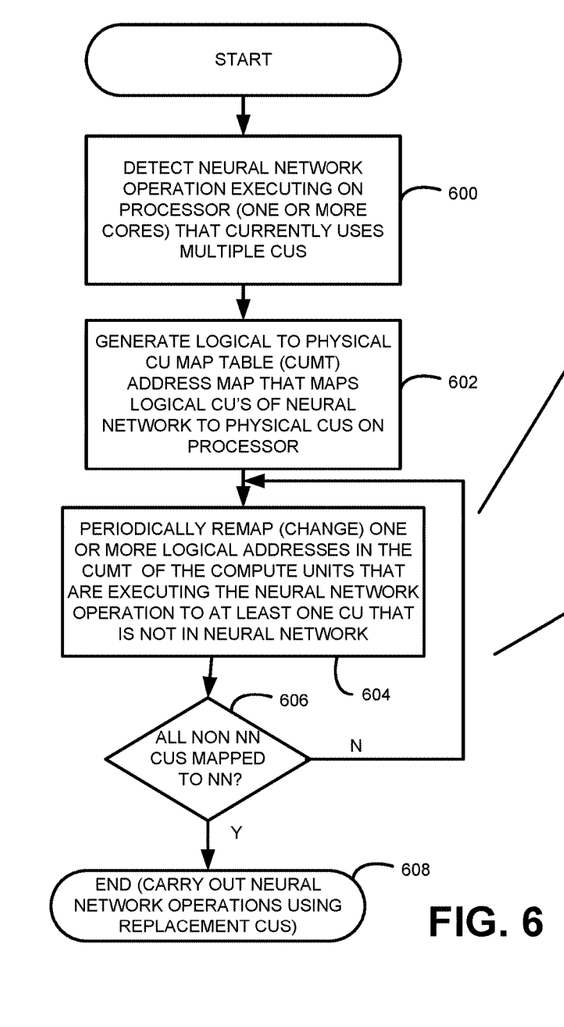
FIG. 6 is a flowchart illustrating one example of a method for controlling a plurality of compute units that carry out neural network operations in accordance with the disclosure.

Referring to FIGS. 6 and 7, a method for controlling a plurality of compute units that carry out a neural network will be described. As shown in block 600, the method includes detecting the neural network operation executing on a processor that currently uses multiple CUs. By way of example, the neural network sequence scheduler 200 in one example includes a compiler executing on processor 102 that when asked to execute a neural network software application on the processor 104, begins a logical to physical mapping of compute units. As shown in block 602, the method includes generating an initial logical to physical CU mapping table 700. The initial compute unit mapping table 700 is created by the remapping controller 202 when a neural network has initially created. The remapping controller 202 generates logical to physical address links to identify which logical CUs are mapped to which corresponding physical CUs on the processor. In this example, the CU mapping table 700 includes data representing currently used compute units in a neural network identified as 702. In this example, logical address 721 is mapped to the CU corresponding to physical address 2 as shown by row 704. Similarly, logical address 20 for a CU in a neural network, is mapped to the compute unit having the physical address 3 as shown in row 706. The CU mapping table 700 in this example also includes data representing unused replacement CUs shown as data 708. In this example, compute unit corresponding to physical addresses 7 and 8 are unused in the current neural network. The CU remapping table 710 illustrates the remapping of logical address 20 to physical address 7. The CU mapping table 700 and CU remapping table 710 are stored in memory such as random access memory (RAM) or any other suitable memory. Physical address 7 was a previously unused compute unit and serves as the replacement compute unit for the compute unit corresponding to physical address 3 as represented by arrow 712. Similarly, as shown by arrow 714, logical address 306 having previous physical address 4 is now mapped to physical address 8 that was previously unused. The unused replacement CUs as shown in 708 are now illustrated as being physical address 3 and 4 represented by arrow 716.

As such, as shown in block 604, the method includes periodically remapping or changing one or more logical addresses in the initial compute unit mapping table that are executing in the neural network to at least one or more CUs that are not in the neural network. As shown in block 606, the method includes determining whether all the unused CUs are mapped to a neural network. If not, the method includes repeatedly remapping unused physical CUs until all the unused CUs are now remapped in the neural network. As shown in block 608, the neural network carries out the operations using the replacement compute units.

The remapping controller 202 as such generates logical to physical CU map table 700 that contains mapping logical addresses of compute units currently being used in performing the neural network operations with physical addresses of CUs that are currently being used in performing the neural network operation as well as data 708 indicating currently unused CUs that will serve as replacement CUs. The remapping shown in table 710 assigns the logical address of a CU currently being used such as physical address 3 to a physical address associated with a currently unused compute unit such as physical address 7.

The detecting of the condition to remap neural networks is repeated and additional remapping operations of additional replacement compute units are performed to balance workload levels among all compute units for neural network operations performed by the compute units in the integrated circuit. This may occur every year or six months or when the conditions for remapping are appropriate. As such, CUs may go from an unused to used and back to unused status depending upon the neural network operation. The remapping table serves as the initial mapping table for the next time a remapping condition is detected.

In one example, a compute unit number is embedded in a return address of data references so the data returns to the proper CU. For example, when a kernel causes a read to occur from memory for a logical CU, the kernel is provided with the appropriate CU mapping information. Stated another way, some input data to a CU that implements processing of neuron #11 of layer #33 is always read by the kernel that executes the functionality of that neuron regardless of which CU is running this kernel. But when the data comes back from memory the kernel needs to know what the return address is for the CU that needs it. It is as though the kernel is moving from one house to another sending the requests and the kernel needs to make sure the return address is always up to date.

Periodically mapping of logical addresses of compute units to different physical CUs, includes in another example, one pass through the neural network or any other suitable periodicity so that the life of the machine intelligent chip is extended. As a result, higher operating voltage for the CUs can be employed. In this regard, the neural network compute unit remapping logic causes the voltage controller (FIG. 1) to increase the operating voltage to the compute units. In one example, the neural network sequence scheduler 200 maintains a history of how long each CU has operated and compares that to a stored baseline specification amount determined through life testing of prior chip testing. For example, if the baseline use amount for a CU is 30 hours a week for a given neural network operation, and the current use amount of a CU is only 10 hours for a given week, the neural network sequence scheduler 200 informs the voltage controller 124 to increase the operating voltage and/or operating frequency of the CU for a following week to increase the average weekly hour amount to be closer to the baseline amount. However, any suitable mechanism and methodology may be employed.

The neural network sequence scheduler 200 and remapping controller 202 may be implemented in any suitable manner such as one or more state machines, a programmable processor and/or a combination of processor executing software instructions and one or more state machines.

In another example, remapping also occurs on a register level or a sub-register level such as on at least one significant bit level. For example, registers that are part of a compute unit are remapped in a similar manner as the CUs. The attempt is to remap register use of CUs to provide more uniform aging of CUs. When the registers are remapped through a register remapping table, the registers for each CU are tracked so that registers that are unused for a particular CU are then remapped as being used the next time the CU is selected as a CU for a neural network. For example, the registers for a particular CU are divided into multiple groups. A count register is maintained to track how much each register group is used and if over time some groups are accessed less than others, the groups are swapped out or remapped. The count register may be maintained by the remapping controller 202 in a similar manner that the compute unit remapping table is employed.

In another example, the registers of compute units are divided into groups and each group is tracked as to the number of times a group is accessed. If non-uniform access is detected over time, remapping of the groups is performed by remapping address bits in the transition to those groups. By way of example, if a Cu always we always read from register #17 and the binary address 17=10001, the neural network remapping logic modifies the address 1x001 and uses the "x" to signal to remap between register 17 (when x=0) and register 25 (when x=1).

Remapping of neural network CUs and/or their registers allow silicon hardware usage patterns to be improved so that aging of compute units is equalized over time by attempting to uniformly distribute neural network compute unit operations uniformly over compute units to extend the life of the silicon chip. If desired, an operational voltage and/or operating frequency of CUs can be increased to speed up their processing until a baseline usage level is reached.

The above detailed description and the examples described therein have been presented for the purposes of illustration and description only and not for limitation. For example, the operations described are done in any suitable manner. It is therefore contemplated that the present implementations cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. A method for controlling a plurality of compute units (CUs) in at least one processor that carries out neural network operations, the method comprising:

detecting, by neural network compute unit remapping logic, a condition to remap neural network compute units that are currently used as a neural network, in carrying out a neural network operation, with at least one replacement compute unit that is not currently being used to carry out the neural network operation based on at least one of: whether there are unused CUs for replacement of currently used CUs for a layer in operation, that a training session for the neural network has been completed, a cyclical calculation pattern and a data movement pattern;

in response to detecting the condition, remapping, by the neural network compute unit remapping logic, a logical address of at least one currently used compute unit to a physical address that corresponds to the replacement compute unit; and carrying out the neural network operations for the same neural network, by the at least one processor, using the replacement compute unit.

2. The method of claim 1 comprising repeating the detecting of the condition and performing additional remapping operations of additional replacement compute units to balance workload levels among all compute units for neural network operations performed by the compute units in the processor.

3. The method of claim 1 wherein remapping comprises generating a remap table that remaps the logical address of at least one currently used compute unit to a different physical address that corresponds to an unused replacement compute unit.

4. The method of claim 1 comprising detecting neural network operation executing on the processor and generating a logical to physical CU map table that contains data mapping logical addresses of CUs currently being used in performing the neural network operations with physical addresses of CUs that are currently being used in performing the neural network operations and data indicating currently unused CUs that will serve as replacement CUs, and wherein remapping comprises assigning the logical address of at least on CU currently being used to a physical address associated with a currently unused CU.

5. The method of claim 1 wherein detecting the condition to remap neural network compute units comprises determining that a time out period occurred.

6. The method of claim 1 further comprising remapping a plurality of registers associated with a currently unused CU such that different registers of the replacement CU are used compared to previous use of the CU during operation of the neural network operations.

7. The method of claim 3 wherein in remapping comprises remapping based on at least one of the following:
tracking usage of CUS and remapping to physical addresses of replacement CUs that are least used;
randomly selecting a currently unused CU as the replacement CU; and
employing a round robin replacement operation to select the replacement CU.

8. An apparatus operative to carry out neural network operations, the apparatus comprising:
a plurality of compute units (CUs) configurable as a neural network for neural network operations; and
neural network compute unit remapping logic operatively coupled to the plurality of CUs, and operative to:
detect a condition to remap neural network compute units that are currently used in carrying out a neural network operation that use the neural network, with at least one replacement compute unit that is not currently being used to carry out the neural network operation based on at least one of: whether there are unused CUs for replacement of currently used CUs for a layer in operation, that a training session for the neural network has been completed, a cyclical calculation pattern and a data movement pattern;
in response to detecting the condition, remap a logical address of at least one currently used compute unit to a physical address that corresponds to the replacement compute unit; and
cause the replacement compute unit to carry out neural network operations for the same neural network.

9. The apparatus of claim 8 wherein the neural network compute unit remapping logic is operative to repeat the detecting of the condition and performing additional remapping operations of additional replacement compute units to balance workload levels among all compute units for neural network operations performed by the compute units.

10. The apparatus of claim 8 wherein the neural network compute unit remapping logic is operative to remap by generating a remap table that remaps the logical address of at least one currently used compute unit to a different physical address that corresponds to an unused replacement compute unit.

11. The apparatus of claim 8 wherein the neural network compute unit remapping logic is operative to detect neural network operation executing on a processor and generate a logical to physical CU map table that contains data mapping logical addresses of CUs currently being used in performing the neural network operations with physical addresses of CUs that are currently being used in performing the neural network operations and data indicating currently unused CUs that will serve as replacement CUs, and wherein remapping comprises assigning the logical address of at least on CU currently being used to a physical address associated with a currently unused CU.

12. The apparatus of claim 8 wherein the neural network compute unit remapping logic is operative to determine that a time out period occurred.

13. The apparatus of claim 8 wherein the neural network compute unit remapping logic is operative to remap a plurality of registers associated with a currently unused CU such that different registers of the replacement CU are used compared to previous use of the CU.

14. The apparatus of claim 10 wherein the neural network compute unit remapping logic is operative to remap CUs based on at least one of the following:
tracking usage of CUS and remapping to physical addresses of replacement CUs that are least used;
randomly selecting a currently unused CU as the replacement CU; and
employing a round robin replacement operation to select the replacement CU.

15. An apparatus operative to carry out neural network operations, the apparatus comprising:
a plurality of compute units (CUs) configurable as a neural network for neural network operations;
a memory hierarchy structure operatively accessible by the plurality of CUs; and
neural network compute unit remapping logic operatively coupled to the plurality of CUs comprising:
a neural network sequence scheduler and a remapping controller, wherein the neural network sequence scheduler is operative to detect a condition to remap neural network compute units that are currently used in carrying out a neural network operation using the neural network, with at least one replacement compute unit that is not currently being used to carry out the neural network operation, based on at least one of: whether there are unused CUs for replacement of currently used CUs for a layer in operation, that a training session for the neural network has been completed, a cyclical calculation pattern and a data movement pattern; and produce remap indication data that indicates to remap a currently mapped logical address of a CU to a different physical CU in response to detecting the remap condition; and wherein the neural network sequence scheduler is operative to produce remap readiness data indicating that a timing of remapping of CUs is appropriate;

the remapping controller, responsive to the remap indication data and to the remap readiness indication data, and in response thereto, generate a remapping table entry that causes a remap of a logical address of at least one currently used compute unit to a physical address that corresponds to the replacement compute unit; and cause the replacement compute unit to carry out neural network operations for the same neural network.

16. The apparatus of claim 15 wherein the neural network sequence scheduler is further operative to determine neural network layer levels, logical CU addresses for needed CUs for a given layer and provide input data and program information for each physical CU that is remapped.

17. The apparatus of claim 15 wherein the neural network compute unit remapping logic is operative to repeat the detecting of the condition and performing additional remapping operations of additional replacement compute units to balance workload levels among all compute units for neural network operations performed by the compute units in a processor.

18. The apparatus of claim 15 wherein the neural network sequence scheduler is operative to determine that a time out period occurred.

* * * * *